United States Patent
Dudesek

(10) Patent No.: US 10,892,097 B2
(45) Date of Patent: Jan. 12, 2021

(54) DIELECTRIC CERAMIC COMPOSITION, METHOD FOR THE PRODUCTION AND USE THEREOF

(71) Applicant: TDK Electronics AG, Munich (DE)

(72) Inventor: Pavol Dudesek, Deutschlandsberg (AT)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/079,403

(22) PCT Filed: Jan. 16, 2017

(86) PCT No.: PCT/EP2017/050794
§ 371 (c)(1),
(2) Date: Aug. 23, 2018

(87) PCT Pub. No.: WO2017/148606
PCT Pub. Date: Sep. 8, 2017

(65) Prior Publication Data
US 2019/0013149 A1   Jan. 10, 2019

(30) Foreign Application Priority Data

Mar. 4, 2016   (DE) .................. 10 2016 103 949

(51) Int. Cl.
*H01G 4/12*       (2006.01)
*C04B 35/457*   (2006.01)
(Continued)

(52) U.S. Cl.
CPC .......... *H01G 4/1272* (2013.01); *C04B 35/16* (2013.01); *C04B 35/457* (2013.01);
(Continued)

(58) Field of Classification Search
None
See application file for complete search history.

(56) References Cited

U.S. PATENT DOCUMENTS 7,138,352 B2 * 11/2006 Lee .................. C01G 23/002
    501/136
7,378,363 B2 * 5/2008 Zheng ................ C04B 35/117
    501/136
(Continued)

FOREIGN PATENT DOCUMENTS

EP    0304647 A2    3/1989
EP    2371787 A1    10/2011
(Continued)

OTHER PUBLICATIONS

Bloise, A. et al., "Flux Growth and Characterization of Ti- and Ni-Doped Enstatite Single Crystals," Journal of Crystal Growth, 329, No. 1, 2011, 6 pages.
(Continued)

*Primary Examiner* — Katie L. Hammer
(74) *Attorney, Agent, or Firm* — Slater Matsil, LLP

(57) ABSTRACT

A dielectric ceramic composition, a method for producing a dieelctric composition and the use of the dielectric composition are disclosed. In an embodiment a ceramic composition includes a main component with a quantity ratio $Mg_{(1+x)(1-y)}O_{3+x}A_{(1+x)y}Si_{(1-z)}D_z$ and a remainder comprising contaminants, wherein $0.01 \leq x \leq 0.30$, wherein $0.00 \leq y \leq 0.20$, and wherein $0.00 \leq z \leq 1.00$.

20 Claims, 2 Drawing Sheets

(51) Int. Cl.
    *C04B 35/462*     (2006.01)
    *C04B 35/48*     (2006.01)
    *H01G 4/10*     (2006.01)
    *H01G 4/30*     (2006.01)
    *H01G 4/33*     (2006.01)
    *C04B 35/626*     (2006.01)
    *C04B 35/16*     (2006.01)

(52) U.S. Cl.
    CPC ............ *C04B 35/462* (2013.01); *C04B 35/48* (2013.01); *C04B 35/6261* (2013.01); *H01G 4/10* (2013.01); *H01G 4/1236* (2013.01); *H01G 4/30* (2013.01); *H01G 4/33* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3232* (2013.01); *C04B 2235/3244* (2013.01); *C04B 2235/3251* (2013.01); *C04B 2235/3262* (2013.01); *C04B 2235/3275* (2013.01); *C04B 2235/3279* (2013.01); *C04B 2235/3284* (2013.01); *C04B 2235/604* (2013.01); *C04B 2235/6021* (2013.01); *C04B 2235/77* (2013.01); *C04B 2235/79* (2013.01); *C04B 2235/80* (2013.01); *H01G 4/1218* (2013.01); *H01G 4/1227* (2013.01)

(56) References Cited

U.S. PATENT DOCUMENTS

| | | | |
|---|---|---|---|
| 2002/0002108 | A1 | 1/2002 | Kim et al. |
| 2003/0116891 | A1* | 6/2003 | Okuyama ........... C04B 35/6262 264/620 |
| 2011/0236634 | A1* | 9/2011 | Kawano ............... C04B 35/457 428/141 |

FOREIGN PATENT DOCUMENTS

| | | |
|---|---|---|
| JP | H09175856 A | 7/1997 |
| JP | H09175858 A | 7/1997 |
| JP | 2001060914 A | 3/2001 |
| JP | 2001278663 A | 10/2001 |
| JP | 2003004594 A | 1/2003 |
| JP | 2004168579 A | 6/2004 |
| JP | 2008069056 A | 3/2008 |
| JP | 2010024082 A | 2/2010 |
| JP | 2010024083 A | 2/2010 |
| WO | 2010061842 A1 | 4/2012 |
| WO | 2017148607 A1 | 9/2017 |

OTHER PUBLICATIONS

Cai, H. et al., "A Microwave Dielectric Material Mg0.5Zn0.5ZrNb2O8," Materials Letters, 144, Elsevier, 2015, 4 pages.

Catalano, M. et al., "Synthesis and Characterization of Zn-Doped Enstatite," Applied Physics A Materials Science & Processing, 120, Jg., No. 1, 2015, 8 pages.

Gogoi, P. et al., "Optical, Dielectric Characterization and Impedance Spectroscopy of Ni-Substituted MgTiO3 Thin Films," Journal of Electronic Materials, vol. 45, No. 2, 2016, 11 pages.

Moncorge, R. et al., "Luminescence of Ni2+ and Cr3+ Centres in MgSio3 Enstatite Crystals," J. Pys.: Condens, Matter 11 6831, 1999, 12 pages.

Song, K.X. et al., "Effects of Mg/Si Ration on Microwave Dielectric Characteristics of Forsterite Ceramics," Journal of the American Ceramic Society, 90, 2007, 4 pages.

Song, M.E. et al., "Synthesis and Microwave Dielectric Properties of MgSiO3 Ceramics," Journal of the American ceramic Society, 90, 2007, 4 pages.

Shaocheng, J., et al.,"Bulk Flow Strength of Forsterite-Enstatite Composites as a Function of Forsterite Content," Elsevier, Tectonophysics, 341 (2001), Aug. 28, 2001, pp. 69-93.

* cited by examiner

DIELECTRIC CERAMIC COMPOSITION, METHOD FOR THE PRODUCTION AND USE THEREOF

This patent application is a national phase filing under section 371 of PCT/EP2017/050794, filed Jan. 16, 2017, which claims the priority of German patent application 10 2016 103 949.7, filed Mar. 4, 2016, each of which is incorporated herein by reference in its entirety.

TECHNICAL FIELD

The invention relates to dielectric ceramic compositions having improved electrical and mechanical properties, for example, for HF components, and to a method for the production of such compositions and to possible uses of such compositions.

BACKGROUND

Ceramic dielectrics can be used as insulating materials in electrical components, for example, as substrate materials. There is a frequent need for materials with a low dielectric constant and a small dissipation factor or high quality factor Q, for example, for use in waveguides, strip-line filters, dielectric resonators, substrates for integrated circuits etc. The group of materials which exhibits good characteristics in particular in a frequency range between 0.5 GHz and 100 GHz is, however, limited.

It is possible to use polymer materials as dielectrics in such components. In comparison with polymer materials, however, ceramic materials generally have greater long-term stability thanks to lower material degradation (for example, due to UV radiation, heat or cold), are more insensitive to moisture, have elevated gas tightness and therefore enable overall higher component reliability.

However, the dielectric constants of ceramic materials are higher than those of organic, polymer-based materials.

Conventional ceramic materials are, for example, cristobalite (a modification of silicon dioxide), tridymite (another modification of silicon dioxide $SiO_2$), cordierite (a magnesium-aluminum silicate), willemite (a silicate of the stoichiometric composition $Zn_2[SiO_4]$), mullite (a silicate comprising aluminum), forsterite (a silicate with the stoichiometric composition $Mg_2SiO_4$), aluminum nitride (AlN), corundum ($Al_2O_3$) and vitreous ceramics. Only the materials cristobalite, tridymite, cordierite, willemite and vitreous ceramics have a dielectric constant which is less than 7. Cristobalite and tridymite are metastable and exhibit a phase transition in the range between 300° C. and 600° C. Cordierite is a material with a high dissipation factor and a very low thermal coefficient of expansion (TCE) of 0.5 ppm/K. Low thermal coefficients of expansion are problematic because they lead to severe thermomechanical stresses in the event of temperature fluctuations. The low thermal coefficient of expansion of willemite likewise restricts the use thereof.

SUMMARY OF THE INVENTION

There is therefore a desire for dielectric materials with a low dielectric constant and small dissipation factor, in particular in frequency ranges beyond 1 GHz. The material may furthermore be RoHS-compliant, i.e., compliant with the Restriction of Hazardous Substances Directive. The thermal coefficient of expansion may furthermore be sufficiently high.

In particular, the dielectric constant should be 7, the quality factor, for example, at 10 GHz, 16,000 and the thermal coefficient of expansion 8 ppm/K.

Moreover, specific density may be as low as possible in order to minimize the weight of components manufactured therefrom. There is furthermore a desire for dielectric ceramic compositions which can be obtained from commonly occurring starting materials.

The composition may also have low sensitivity to contaminants. In other words, contamination with additional substances may modify the essential characteristics of the composition at most to a tolerable extent.

Various embodiments provide a method for producing such dielectrics and various other embodiments provide ceramic components with improved mechanical and electrical characteristics which are based on corresponding dielectrics.

The ceramic composition comprises a main component and a remainder. The composition of the remainder is substantially determined by contaminants during production. The dominant component of the composition is the main component and has the quantity ratio:

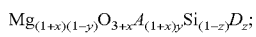

$$Mg_{(1+x)(1-y)}O_{3+x}A_{(1+x)y}Si_{(1-z)}D_z;$$

x is here a real number which is ≥0.01 and ≤0.3; y is a real number which is ≥0 and ≤0.2; and z is a real number between 0 and 1.

The main component of the ceramic composition thus predominantly comprises Mg (magnesium), O (oxygen), a further element A, Si (silicon) and a further remainder D. Possible and advantageous elements for A and for D are stated further below.

In a simple composition, the ceramic composition is thus obtained as a non-stoichiometric magnesium silicate.

The number x states the relative quantity of MgO which is present as an excess in the ceramic composition. The number y states the relative quantity of the element represented by A which can replace Mg. The number z states the relative quantity of the element represented by the symbol D which can replace Si.

The improved electrical and mechanical properties of the stated ceramic composition are surprising. Investigations into the ceramic compositions forsterite ($Mg_2SiO_4$) and enstatite ($MgSiO_3$) (for example, "Effect of Mg/Si Ratio on Microwave Dielectric Characteristics of Forsterite Ceramics"; K. X. Song, X. M. Chen, X. C. Fan; J. Am. Ceram. Soc, 90 [6] 1808-1811 (2007); "Synthesis and Microwave Dielectric Properties of $MgSiO_3$ Ceramics"; M. E. Song, J. S. Kim, M. R. Joung, S. Nahm, Y. S. Kim, J. H. Paik, B. H. Choi; J. Am. Ceram. Soc, 91[8] 2747-2750 (2008)) have revealed the electrical characteristics of these ceramics. Enstatite and forsterite can be associated with different crystal structures on the basis of their differing stoichiometric compositions. The dielectric quality of ceramics with 2 crystal phases can vary monotonically as a function of composition from a relatively low value to a higher value or through a minimum. This minimum can be very flat or also highly pronounced. This is explained by dielectric losses at grain boundaries between two non-identical phases. The more such grain boundaries are present, the greater is the contribution to the overall losses which occur. If such a minimum of dielectric quality is present, it is in a ceramic composition having a maximum of grain boundaries. Both enstatite and forsterite have a relatively high dielectric. A composition which contains less Mg than stoichiometric forsterite would therefore have substantially impaired quality in comparison with a stoichiometric forsterite ceramic. It was therefore to be expected for the electrical quality of a ceramic composition at a 1:1 ratio of Mg and Si (enstatite) and at a 2:1 ratio of Mg and Si (forsterite) to have local maxima. At mixture ratios between 1:1 and 2:1, impairment of the electrical characteristics was therefore to be expected. Electrical quality would decline between these ratios.

It has, however, now been found that, on the basis of the 1:1 ratio of enstatite, increasing the concentration of Mg to ratios between 1:1 and 2:1 unexpectedly improves electrical quality.

It is possible for the value of x to be $\geq 0.02$ and $\leq 0.08$. Over this range of values of x, the ceramic composition has a particularly small dielectric constant and simultaneously a high electrical quality factor Q, for example, $Q^*f=160$ THz to 200 THz (and potentially even up to 220 THz). By way of comparison, literature values for enstatite are about $Q^*f=120$ THz.

Quality values $Q^*f$ of 160 THz are here even possible at a relatively high level of contaminants, which demonstrates how well the electrical quality withstands contaminants.

It is possible for x to amount to 0.17. In this case, the ceramic composition can have a density of 3.039 g/cm³. The dielectric constant can amount to 6.63.

It is furthermore possible for x to have the value 0.04. In this case, a specific density of 3.06 g/cm³ on the one hand and a dielectric constant of 6.57 on the other hand can be obtained. When x=0, the specific density can amount to 3.06 at a dielectric constant of 6.2, wherein the quality factor is reduced in comparison with higher values of x.

It is possible for A, in conjunction with an oxygen atom, to form a divalent oxide AO. A can here be selected from Zn (zinc), Ni (nickel), Co (cobalt), Mn (manganese) and a mixture of Zn, Ni, Co, Mn. The corresponding divalent oxide would then in each case be ZnO (zinc oxide), NiO (nickel oxide), CoO (cobalt oxide) or MnO.

It is possible for D together with $O_2$ to represent a tetravalent oxide. D can here in particular be selected from Ti (titanium), Sn (tin), Zr (zirconium) and a mixture of Ti, Sn and Zr. The corresponding tetravalent oxide would then in each case be $TiO_2$, $SnO_2$ or $ZrO_2$.

It is possible for the remainder to contain production-related contaminants. Starting materials for producing the above-stated ceramic composition can be ground to powder with mills, for example, ball mills, tumbling mills, tube mills, attritor mills etc. Abrasion products, for example, from zirconium oxide balls, here virtually inevitably get into the starting products of the ceramic composition and contaminate the composition.

Insensitivity of the electrical and mechanical properties of the ceramic composition to such contaminants may be important. In this manner, qualities of around $Q^*f=160$ THz are readily achievable despite contaminants.

The remainder of the composition can contain corresponding proportions of $Al_2O_3$, $ZrO_2$, $TiO_2$, $Nb_2O_5$ or $Ta_2O_5$.

The remainder can contain divalent elements. The remainder can furthermore contain divalent elements such as Ca (calcium), Sr (strontium) and/or Ba (barium). Calcium, strontium or barium can in each case be present in a proportion of 0.3 mol % or less based on the total composition.

It is possible for the ceramic composition to consist to an extent of 95 mol % or more of the main component.

One possible ceramic composition has a dielectric constant of $\leq 7$ in the frequency range between 0.5 GHz and 100 GHz. The quality factor Q has a value of 16000 or above at 10 GHz. The thermal coefficient of expansion is 8 ppm/K. The specific density is 3.5 g/cm³.

A method for the production of a ceramic composition comprises the steps of: providing calcined powders comprising MgO, AO, $SiO_2$, $DO_2$, combining the powders with a bonding agent and producing pressable pellets, pressing the pellets, decarbonizing the pressed pellets, sintering, wherein A is selected from Zn, Ni, Co and a mixture of Zn, Ni, Co, D is selected from Ti, Sn, Zr and a mixture of Ti, Sn, Zr.

It is here possible for the calcined powders to be provided in the frequency ratio

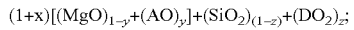

$(1+x)[(MgO)_{1-y}+(AO)_y]+(SiO_2)_{(1-z)}+(DO_2)_z;$ with $0.01 \leq x \leq 0.30$; $0.00 \leq y \leq 0.20$; and $0.00 \leq z \leq 1.00$.

As an alternative to pressing the pellets, an extrusion method can also be used.

The composition can also be produced by means of film casting. This type of production is preferable if multilayer substrates are to be produced.

A ceramic composition as stated above can be used as a dielectric, for example, in a waveguide, a strip-line filter, a microwave ceramic filter, a dielectric resonator, a substrate for integrated circuits or a multilayer substrate for integrated circuits with integrated passive circuit elements.

The corresponding electrical components can be provided for use in a frequency range between 0.5 GHz and 100 GHz.

BRIEF DESCRIPTION OF THE DRAWINGS

An illustration of the stoichiometric ratios of the ceramic compositions as well as schematic components to clarify the application by way of example are shown in the figures to facilitate understanding of the principle on which the composition is based.

In the figures.

DETAILED DESCRIPTION OF ILLUSTRATIVE EMBODIMENTS

Figure 1:
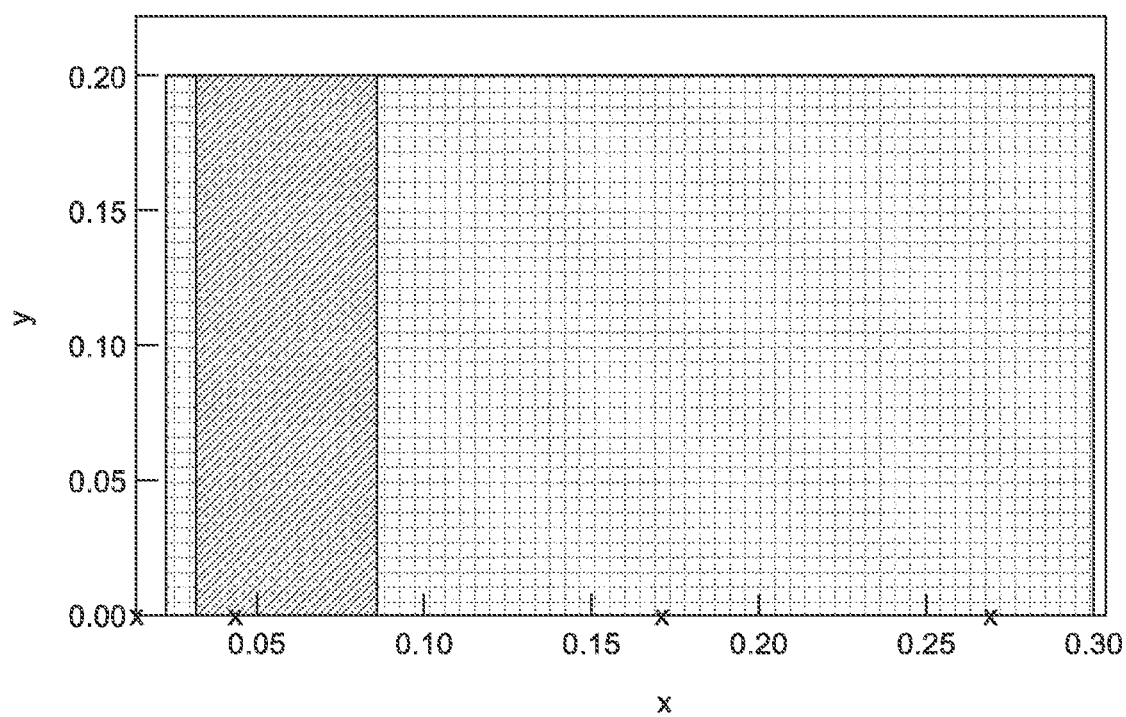
FIG. 1 shows advantageous value ranges for x and y and exemplary values for x at y=0.

FIG. 1 shows possible and advantageous values for x and y. x can be selected between 0.01 and 0.3. x is advantageously between 0.02 and 0.08. The electrical and mechanical properties of the ceramic composition are relatively stable with regard to a variation in y, such that, in the stated range, y can be relatively freely selected without impairing characteristics. The indicated combinations for y=0 and x=0.27; 0.18; 0.04 and x=0.00 are indicated by crosses.

Figure 2:
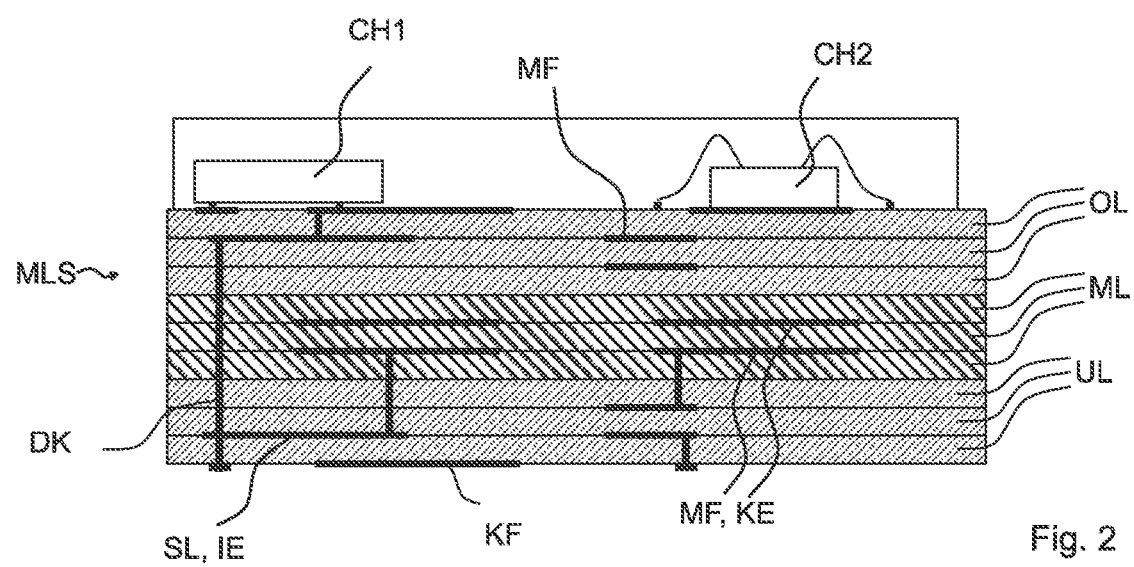
FIG. 2 shows an electrical device with a ceramic multi-layer substrate.

FIG. 2 shows an exemplary application of the ceramic composition as a material for a multilayer substrate with integrated circuit elements. The multilayer substrate MLS can combine different ceramic compositions, for example, in lower layers UL, middle layers ML and upper layers OL. Signal conductors SL, inductive elements IE and capacitive elements KE can be interconnected by means of vias DK. Chips CH1, CH2 can be arranged and interconnected on the upper side of the multilayer substrate MLS. Contact surfaces for interconnection with an external circuit environment can be arranged on the underside of the multilayer substrate MLS.

Figure 3:
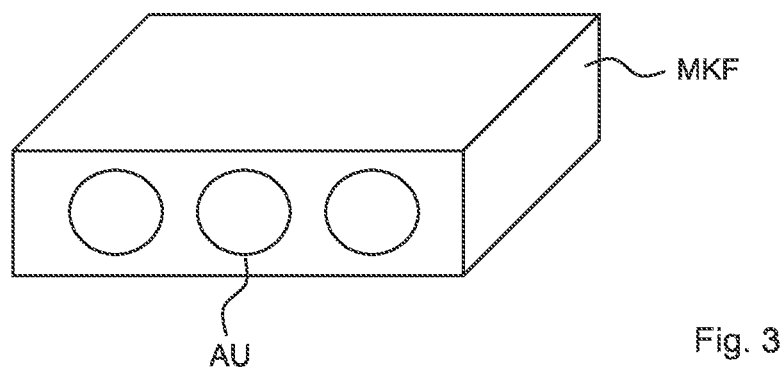
FIG. 3 shows a microwave ceramic filter.

FIG. 3 shows a microwave ceramic filter MKF with a ceramic base member made from the ceramic composition. Cylindrical recesses AU with metallized circumferential surfaces are arranged in the base member. The recesses thus form resonating cavities which act as HF filters by producing resonance at a resonant frequency.

Figure 4:
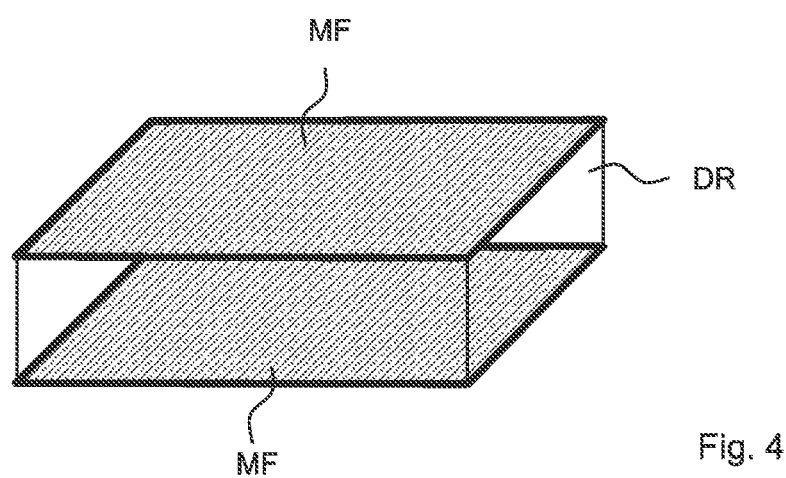
FIG. 4 shows a dielectric resonator.

FIG. 4 shows a further possible use of the ceramic composition, namely as a dielectric resonator DR having a ceramic body between two metallized surfaces MF.

The ceramic composition and the use of the ceramic composition and the method for the production of a ceramic composition are not limited to the described embodiments and the exemplary embodiments shown. In particular, thanks to the stability of the electrical and mechanical properties of the composition, both the main component and the remainder of the composition can comprise further elements. Use in further HF components is likewise possible.

The invention claimed is:

1. A ceramic composition comprising:
   a main component with a quantity ratio $Mg_{(1+x)(1-y)}O_{3+x}A_{(1+x)y}Si_{(1-z)}D_z$; and
   a remainder comprising contaminants,
   wherein A is selected from the group consisting of Zn, Ni, Co, Mn and a mixture of Zn, Ni, Co, Mn,
   wherein D is selected from the group consisting of Ti, Sn, Zr and a mixture of Ti, Sn, Zr,
   wherein $0.01 \leq x \leq 0.30$,
   wherein $0.00 \leq y \leq 0.20$, and
   wherein $0.00 \leq z \leq 1.00$.

2. The ceramic composition according to claim 1, wherein $0.02 \leq x \leq 0.08$.

3. The ceramic composition according to claim 1, wherein AO is a divalent oxide.

4. The ceramic composition according to claim 1, wherein $DO_2$ is a tetravalent oxide.

5. The ceramic composition according to claim 1, wherein the remainder contains production-related contaminants.

6. The ceramic composition according to claim 1, wherein the remainder contains $Al_2O_3$, $ZrO_2$, $TiO_2$, $Nb_2O_5$ or $Ta_2O_5$.

7. The ceramic composition according to claim 1, wherein the remainder contains divalent elements.

8. The ceramic composition according to claim 1, wherein the remainder contains Ca, Sr and/or Ba, in each case in a proportion of 0.3 mol % or less based on a total composition.

9. The ceramic composition according to claim 1, wherein the ceramic composition comprises of the main component to an extent of 95 mol % or more.

10. The ceramic composition according to claim 1,
    wherein the ceramic composition has a dielectric constant of $\leq 7$ in a frequency range between 0.5 GHz and 100 GHz,
    wherein the ceramic composition has a quality factor Q of >16000 at 10 GHz,
    wherein the ceramic composition has a thermal coefficient of expansion of $\geq 8$ ppm/K, and
    wherein the ceramic composition has a specific density of $\leq 3.5$ g/cm$^3$.

11. A method for producing the ceramic composition according to claim 1 by film casting.

12. A waveguide comprising:
    a dielectric comprising the ceramic composition according to claim 1.

13. The waveguide according to claim 12, wherein the waveguide has a frequency range between 0.5 GHz and 100 GHz.

14. A strip-line filter comprising:
    a dielectric comprising the ceramic composition according to claim 1.

15. A microwave ceramic filter comprising:
    a dielectric comprising the ceramic composition according to claim 1.

16. A dielectric resonator comprising:
    a dielectric comprising the ceramic composition according to claim 1.

17. The ceramic composition according to claim 1, wherein A is Zn.

18. The ceramic composition according to claim 1, wherein A is Ni.

19. The ceramic composition according to claim 1, wherein A is Co.

20. The ceramic composition according to claim 1, wherein A is Mn.

* * * * *